United States Patent
Wurster et al.

(10) Patent No.: US 6,672,470 B2
(45) Date of Patent: Jan. 6, 2004

(54) PROCESS FOR IMPROVING MATERIAL THICKNESS DISTRIBUTION WITHIN A MOLDED BOTTLE AND A BOTTLE THEREFROM

(75) Inventors: Michael P. Wurster, Tecumseh, MI (US); Kevin D. Gaydosh, Adrian, MI (US); Christopher C. LaBombarbe, Ypsilanti, MI (US)

(73) Assignee: Schmalbach-Lubeca AG (DE)

( * ) Notice: Subject to any disclaimer, the term of this patent is extended or adjusted under 35 U.S.C. 154(b) by 0 days.

(21) Appl. No.: 10/105,685

(22) Filed: Mar. 25, 2002

(65) Prior Publication Data

US 2002/0148805 A1 Oct. 17, 2002

Related U.S. Application Data

(62) Division of application No. 09/835,203, filed on Apr. 13, 2001, now Pat. No. 6,569,376.

(51) Int. Cl.[7] .................................................. B65D 1/46
(52) U.S. Cl. ........................ 215/373; 215/371; 220/606; 220/608
(58) Field of Search ................................. 215/370, 373, 215/371; 220/606, 608

(56) References Cited

U.S. PATENT DOCUMENTS

| | | | | |
|---|---|---|---|---|
| 3,757,978 A | * | 9/1973 | Gilbert | 215/373 X |
| 3,917,095 A | * | 11/1975 | Seefluth | 215/373 X |
| 4,372,455 A | * | 2/1983 | Cochran | 215/385 |
| 4,502,607 A | * | 3/1985 | Szajna | 215/373 X |
| 4,989,738 A | * | 2/1991 | Thayer et al. | 315/373 |
| 4,997,692 A | * | 3/1991 | Yoshino | 215/373 X |
| 5,072,841 A | | 12/1991 | Okhai | 215/1 C |
| 5,158,817 A | * | 10/1992 | Krishnakumar | 428/36.92 |
| 5,648,133 A | * | 7/1997 | Suzuki et al. | 215/370 X |
| 5,906,286 A | * | 5/1999 | Matsuno et al. | 215/373 X |
| 5,908,127 A | * | 6/1999 | Weick et al. | 215/373 |
| RE36,639 E | | 4/2000 | Okhai | 215/375 |

* cited by examiner

Primary Examiner—Sue A. Weaver
(74) Attorney, Agent, or Firm—Harness, Dickey & Pierce, P.L.C.

(57) ABSTRACT

A process and a bottle made from this process where the bottle has improved material thickness distribution within the bottom or base portion. The bottle has a noncircular cross-sectional configuration with corresponding major and minor axes. The mold-base region of the bottle mold-cavity features at least one standing rib-like projection generally parallel to the major axis. The standing rib-like projection increases surface distance in a direction generally corresponding with the minor axis. An expanding heated preform traverses the increased surface distance causing the preform to thin more than what otherwise would be the case thus improving material thickness distribution of the base portion that in turn minimizes unwanted bottle shape distortions.

17 Claims, 4 Drawing Sheets

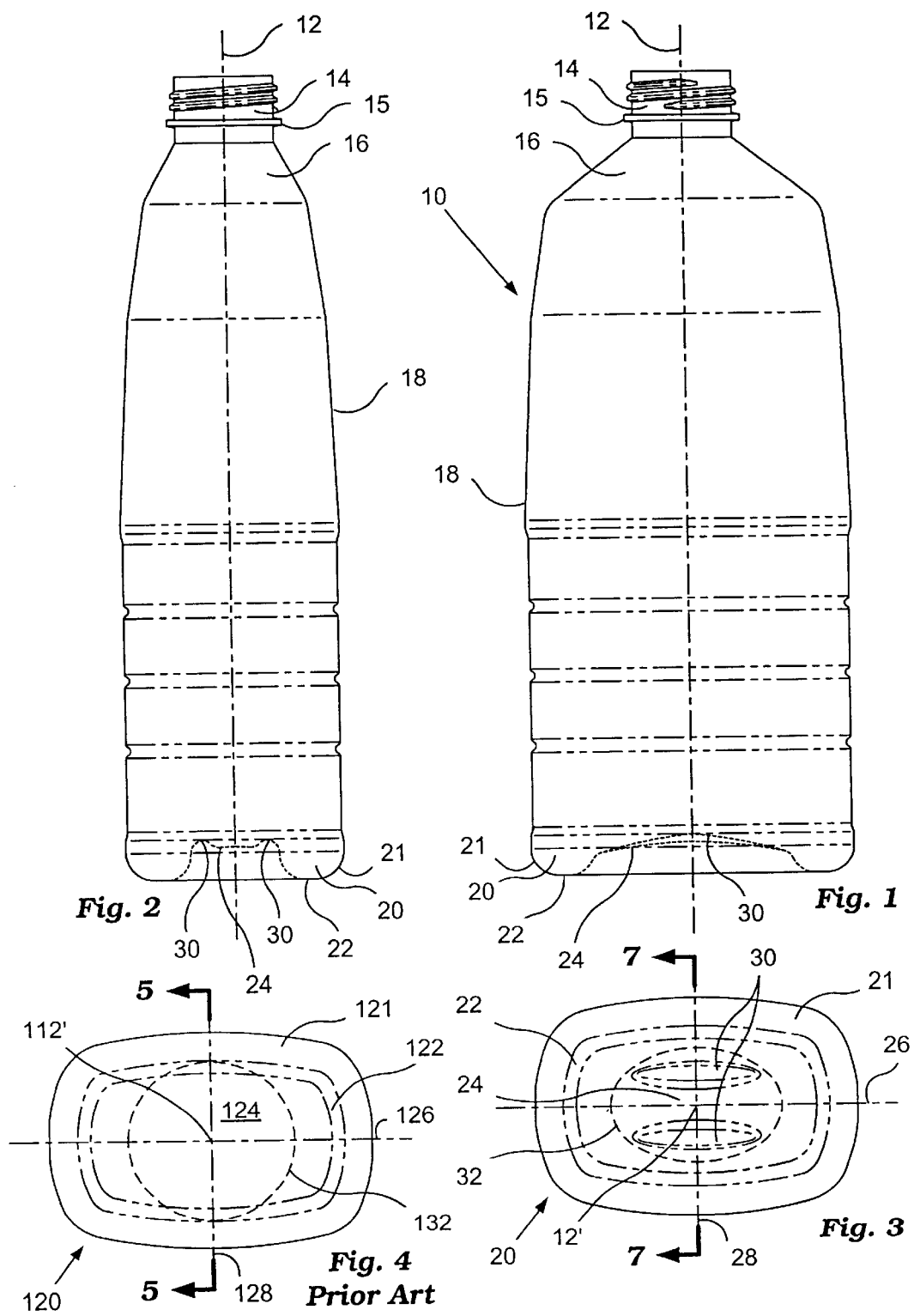

PROCESS FOR IMPROVING MATERIAL THICKNESS DISTRIBUTION WITHIN A MOLDED BOTTLE AND A BOTTLE THEREFROM

CROSS-REFERENCE TO RELATED APPLICATIONS

This application is a divisional of U.S. patent application Ser. No. 09/835,203 filed on Apr. 13, 2001, U.S. Pat. No. 6,569,376. The disclosure of the above application is incorporated herein by reference.

BACKGROUND OF THE INVENTION

1. Field of the Invention

This invention relates to a process for improving material thickness distribution within a molded bottle and the bottle made with the process. The bottle has a closed base or bottom, an open-end, a longitudinal axis, and a generally square, generally rectangular, or generally oval or other noncircular cross-sectional shape typically perpendicular to the longitudinal axis. In particular, the process is for improving material thickness distribution within the bottle base portion or bottom. The bottle base portion contains a chime, contact surface, and push-up region.

The process relies on a mold-cavity base or bottom region of a blow-molding tool modified with at least one generally straight standing rib. The rib (or two or more parallel ribs) alters mold-cavity bottom geometry that redirects material flow during bottle manufacture allowing better placement and distribution of material that in turn minimize unwanted shape distortions in the molded bottle that could otherwise occur.

The invention is suited for bottles made of polyester materials, such as polyethylene terephthalate (PET), or other polymeric materials. The invention is further suited for bottles generally made with an injection based manufacturing process or its equivalent.

2. Description of the Prior Art

Processors generally make bottles from a relatively hot pliable parison or preform using one of several well-known process technologies for making, heating or re-heating the preform, and forming the preform into the bottle. Air pressure inflates this hot pliable preform against a relatively cool cavity surface within the blow-molding tool to form the bottle configuration having approximately the same surface area and shape. Usually, the blow-molding tool is metal and typically aluminum. A molding technician sizes the preform so that, once inflated, the bottle has an appropriate wall thickness and reasonably uniform material thickness distribution throughout its surface.

Achieving good material thickness distribution using the injection based manufacturing process featuring an injection-molded preform is relatively easy for a bottle with a substantially circular cross-sectional configuration. An injection-molded preform is generally a tube with a longitudinal axis, a circular cross-sectional shape perpendicular to the longitudinal axis, and having a sidewall with a substantially uniform material thickness distribution, one open-end, and one closed-end. The longitudinal axis of the preform before inflation typically will coincide with the longitudinal axis of the molded bottle made from that preform.

In general, industry uses two injection based blow-molding process technologies. In the first process, preform length is approximately the same as bottle height. Before inflation, the preform closed-end is adjacent or in close proximity to the mold-cavity section forming the bottle push-up. In the second process, preform length is substantially less than bottle height. Before inflation, a stretch-rod stretches the hot pliable preform in an axial direction corresponding with the preform longitudinal axis, generally pinning the preform closed-end against the mold-cavity section forming the bottle push-up before air pressure completely expands the preform in other directions. The industry generally refers to this second process as "stretch" blow molding or "biaxial molecular orientation" blow molding. The stretch blow molding process is particularly suited for manufacturing bottles of PET polymer materials.

While the technician strives for the uniform material thickness distribution in the molded bottle, compromises are still often necessary. Regions within the push-up, for example, will tend to have a relatively thicker wall section than most other regions of the molded bottle.

Bottles with generally rectangular or oval cross-sectional shapes, shapes with its inherent major or primary axis and minor or secondary axis generally perpendicular to the bottle longitudinal axis, are often difficult to blow-mold when made with the injection-molded preform. Regions of the inflating preform that must move and stretch a greater distance in a direction generally corresponding with the major or primary axis of the bottle cross-sectional shape will tend to thin more than regions that move in a direction generally corresponding with the minor or secondary axis. Consequently, material thickness distribution is not uniform. The bottle wall thickness adjacent to the ends of the primary axis will tend to be thinner than the bottle wall thickness adjacent to the ends of the secondary axis.

Molding technicians have a number of techniques to improve the material thickness distribution of rectangular or oval bottles, that is, techniques to establish a reasonably uniform material thickness distribution. One approach involves changing how quickly selected regions within the preform stretch by changing the material temperature in that region. A slightly cooler preform region in the preform sidewall will tend to resist and stretch less than adjacent warmer regions. Aligning the cooler preform regions with corresponding areas of the bottle that tend to have an otherwise relatively thinner wall thickness will consequently stretch less thus improving material thickness distribution uniformity.

While this approach, sometimes known as "heat profiling," is effective for improving material thickness distribution uniformity within the sidewall, it is generally not effective for improving material thickness distribution uniformity within the push-up and the molded bottle base or bottom portion. This ineffectiveness is primarily for two reasons.

First, the preform closed-end, the region that forms the bottle base and push-up and having a generally hemispherical shape, is relatively small. While it is feasible to heat profile the entire closed-end to a specific temperature, it is not practical, because of its small size, to heat profile sub regions within the closed-end. Consequently, the heat profiling of the entire preform closed-end region is a compromise generally favoring a need for greater movement in the direction corresponding with the major axis of the bottle cross-sectional shape.

Second, the wall thickness in an area of the push-up surrounding the longitudinal axis of the molded bottle remains relatively thick because the preform closed-end region of the inflating preform has little opportunity to stretch or thin before contacting the relatively cool cavity surface of the blow-mold tool forming the bottle configuration. The wall thickness of preform areas initially contacting portions of the bottle cavity surface will not significantly thin further as the remainder of the inflating preform continues to stretch and come in contact with remaining portions of the bottle cavity surface.

Consequently, the lack of effective heat profiling and the lack of sufficient stretch or thinning of the preform with its circular cross-sectional shape causes the material distribution surrounding the longitudinal axis of the bottle push-up and bottom to have a predominantly thick circular character. The molding process for bottles having a generally square, rectangular, or oval cross-section places this thick circular material distribution within the push-up and base having a corresponding square, rectangular, or oval character.

Overall, the relatively thick areas of the molded bottle tend to cool during manufacture at a slower rate. Consequently, the material within these thick areas is prone to warp and distort. Furthermore, molding technicians, attempting to increase production output, will often remove the bottle from the blow-mold tool before thick areas have sufficiently cooled risking additional distortion of those areas.

When the bottle stands in a typical upright fashion, a region of the base or bottom contacts a supporting surface. The distortions from differences in wall section thickness are generally not a problem with bottles having the circular cross-sectional configuration because these distortions are generally contained within the push-up and out-of-sight. The bottle base portion contacting the supporting surface is usually unaffected.

However, the distortions can create significant problems with bottles having the generally non-circular cross-sectional configuration because the distortions can often extend into the base or bottom contact surface. Sometimes the distortions can extend through the contact surface in the chime. At best, this creates a minor aesthetic problem. At worst, this can alter bottle standing stability by creating a condition molding technicians refer to as a "rocker bottom." The rocker bottom condition can create a bottle stability problem on high-speed filling lines, particularly before the bottle filling station.

The process discovered by the inventors permits better placement and control of material thickness distribution within the bottle base or bottom thus minimizing unwanted base distortions. Until this invention, often molding technicians minimized distortions by reduced blow-molding machine output to allow more time for thick areas to cool. This reduces productivity and increases molding cost.

The typically metal blow-molding tool used to manufacture the bottle has several components. One of these components is the mold-cavity base section or region that contains the cavity surface that ultimately forms the base and push-up portion of the molded bottle.

In the case of the noncircular bottle cross-sectional shape, the inventors add to the cavity surface that forms the push-up at least one standing rib-like projection generally parallel to the major axis. Adding these rib-like projections increases push-up surface area and increases surface distance the expanding preform must traverse particularly in the direction generally corresponding with the minor axis. Although not necessarily equal, surface distance in this minor axis direction now approaches the surface distance in the direction corresponding with the major axis.

In addition, the inventors believe the standing rib-like projections slightly alter preform inflation dynamics during bottle manufacture. Because the preform tends to expand first in a direction of least resistance, the rib-like projections tend to initially channel movement of the expanding parison at the base in the direction generally parallel to the rib-like projection thus encouraging additional material to flow in that direction before flow occurs over the rib-like projections in the direction generally parallel to the minor axis. In other words, the rib-like projections briefly block material flow. The standing rib-like projections cause the closed-end of the preform to stretch differently in the direction parallel to the rib-like projection thus favorably altering material thickness distribution.

The relatively thick area of the bottom of the molded bottle is now contained within the push-up minimizing a likelihood of unwanted distortions extending into the base contact region or surface. With less risk of unwanted distortion, molding technicians are now able to increase blow-molding machine output.

The rib-like projections create rib-like grooves in the bottle push-up. Two of these rib-like grooves are particularly useful for bottles having a symmetrical rectangular or oval cross-sectional shape. The inventors anticipate that three or more generally parallel rib-like grooves would be appropriate for some applications of the technology. In the case of three, the middle projection will generally correspond to the major axis.

For bottles having the generally square cross-sectional shape, the inventors anticipate that two pairs of rib-like grooves would be appropriate for some applications of the technology. In this case, a pair of rib-like grooves, each set parallel to the major/minor axes.

The inventors also anticipate that one rib-like projection may be appropriate for certain situations where the cross-sectional shape of the bottle is non-symmetrical in character. For example, a cross-sectional shape resembling the profile of a "kidney bean," that is, having a generally convex shape on one side and a generally concave shape on the opposite side. The one rib approach is appropriate when the relatively thick bottom material would otherwise favor the concave side over the convex side.

In practice, during initial molding trials of the tooling, the inventors make small adjustments to the shape of the standing rib-like projections on the mold cavity surface. These adjustments (usually involving subtle changes in rib taper, relative height, smoothness, roundness, and length) help optimize the material thickness distribution of the blow-molded bottle. Furthermore, to simplify these adjustments, the inventors make the rib-like projections "metal safe," that is, slightly larger than necessary, to allow relatively easy removal of metal while adjusting the shape. Rib-like projections that are too high or too sharp will tend to overcompensate and to over-thin material thickness. Once the molding operators optimize the shape of the standing rib-like projection, mold makers can easily duplicate the shape in other duplicate mold tooling cavities.

The preferred blow-molding process for improving material thickness distribution within a bottle and in particular a bottle base portion having a longitudinal axis and a noncircular cross-sectional shape generally perpendicular to the longitudinal axis of the bottle comprising the steps of heating a preform with a closed-end and a longitudinal axis; positioning the preform in a mold-cavity of the bottle; the mold-cavity having a mold-base region with at least one generally straight standing rib; expanding the preform with air pressure against the standing rib causing the expanding preform to traverse a relatively longer surface distance across the standing rib; expanding the preform against the mold-base region and the mold-cavity to form the bottle; allowing the bottle to cool; and removing the bottle from the mold-cavity. The mold-cavity has a longitudinal axis that corresponds with the longitudinal axis of the bottle made from the mold-cavity and the longitudinal axis of the preform positioned initially to generally correspond with the longitudinal axis of the mold-cavity.

The blow-molding process can also comprise positioning the closed-end in close proximity to the mold-base region before the preform completely expands.

The blow-molding process can also comprise the step where the expanding preform expands against the standing rib causing material flowing from the closed-end to be momentarily directed along the standing rib before the expanding preform completely traverses the standing rib.

The blow-molding process can also comprise the step where the expanding preform expands in the mold-cavity for a bottle having either a generally square, rectangular, or oval cross-sectional shape. The cross-sectional shape has a major axis and a minor axis generally perpendicular to the longitudinal axis of the bottle.

The blow-molding process can also comprise the step where the expanding preform expands against the mold-base region having at least a pair of standing ribs. Each rib of the pair of standing ribs is generally parallel to and positioned on an opposite side of the major axis.

The blow-molding process can also comprise the step where the expanding preform expands against the pair of standing ribs causing material flowing from the closed-end to be momentarily directed non-radially along each rib of the pair of standing ribs and between the pair of standing ribs in a direction generally biased toward or corresponding to the major axis before the expanding preform completely traverses each rib of the pair of standing ribs.

The blow-molding process can also comprise the step where the expanding preform expands against a third standing rib, parallel and between the pair of standing ribs.

The blow-molding process can also comprise the step where the expanding preform expands in the mold-cavity for a bottle having a generally kidney bean cross-sectional shape with a generally convex side and a generally concave side. The cross-sectional shape has a primary axis and a secondary axis generally perpendicular to the longitudinal axis of the bottle. The standing rib is substantially parallel to the primary axis and between the primary axis and the generally concave side.

The blow-molding process creates a base portion within a blow-molded bottle having improved material thickness distribution and where the base portion merges with a bottle sidewall and the bottle sidewall merges with an open end. The base portion has a noncircular cross-sectional shape, a chime; a contact surface merging with the chime, a push-up region merging with the contact surface, and at least one generally straight rib-like groove within said push-up. The rib-like groove is substantially parallel to the primary axis of the cross-sectional shape of the bottle.

From the following description of the preferred embodiment, the appended claims, and the accompanying drawings, additional benefits and advantages of the present invention will become apparent to those skilled in the art to which this invention relates.

DESCRIPTION OF THE DRAWINGS

FIG. 1 is a front elevational view of a bottle;

FIG. 2 is a side elevational view of the bottle shown in FIG. 1;

FIG. 3 is a bottom view of the bottle in FIG. 1 and FIG. 2;

FIG. 4 is a bottom view of a prior art bottle;

DESCRIPTION OF THE INVENTION

Figure 5:
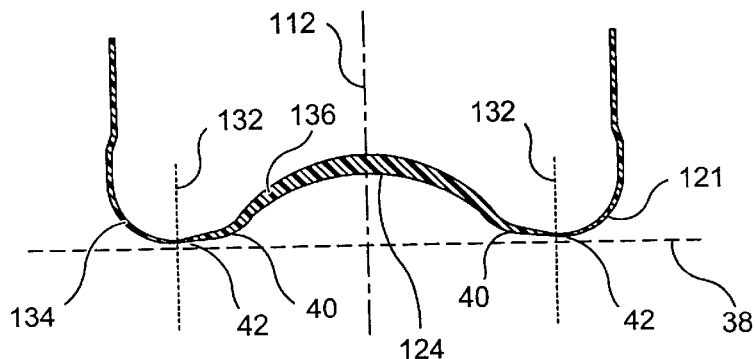
FIG. 5 is an enlarged partial cross-sectional view along line 5—5 of the bottom shown in FIG. 4.

Referring now to the drawings, FIG. 1 and FIG. 2 illustrate a bottle 10 that is typical of this invention. Proper practice of the manufacturing process creates certain desirable readily identifiable characteristics in the molded bottle 10. The process and the bottle created by the process are specifically related. Understanding the process requires understanding bottle 10 attributes that result from the process.

Bottle 10 has a longitudinal axis 12, neck finish 14 surrounding an open-end, flange 15, shoulder 16, sidewall 18, and base or bottom 20. Neck finish 14, flange 15, shoulder 16, sidewall 18, and bottom 20 combine to define an outer surface shape to bottle 10.

Bottom 20 consists of a contact surface 22, which contacts a resting surface 38 (FIG. 7) when bottle 10 is standing in a normal upright fashion. Bottom 20 also consists of a chime 21 and a push-up 24 that merges with and generally rises above contact surface 22. The chime 21 is an outside curved portion or outer edge portion of the bottom 20 that generally extends from the contact surface 22 to a point where the bottom 20 merges with the sidewall 18. The push-up 24 is a remaining portion of bottom 20 generally surrounded by the contact surface 22 (see FIG. 3).

FIG. 3 illustrates a bottom view of bottle 10 with its generally rectangular or generally oval character having a primary or major axis 26 and a secondary or minor axis 28. Bottle processors skilled in the art will realize other shapes are feasible. Furthermore, those skilled in the art will realize the shape of bottom 20, as seen in FIG. 3, substantially corresponds with the cross-sectional shape generally perpendicular to axis 12 of bottle 10. Major axis 26 and minor axis 28 intersect at point 12' corresponding to a point along longitudinal axis 12.

Push-up 24 features a set of rib-like grooves 30 positioned generally parallel to and at least one each on opposite sides of major axis 26. The rib-like grooves 30 (FIG. 2 and FIG. 7) when viewed from the inside of bottle 10 appear to be upstanding ribs or projections, when viewed from the outside of bottle 10 appear to be grooves. Those skilled in the art will realize that the blow-molding tool has a cavity surface forming the rib-like grooves 30. The cavity surface has standing rib-like projections that dictate and generally correspond with the outer surface shape of the rib-like groove within bottle 10.

Figure 10:
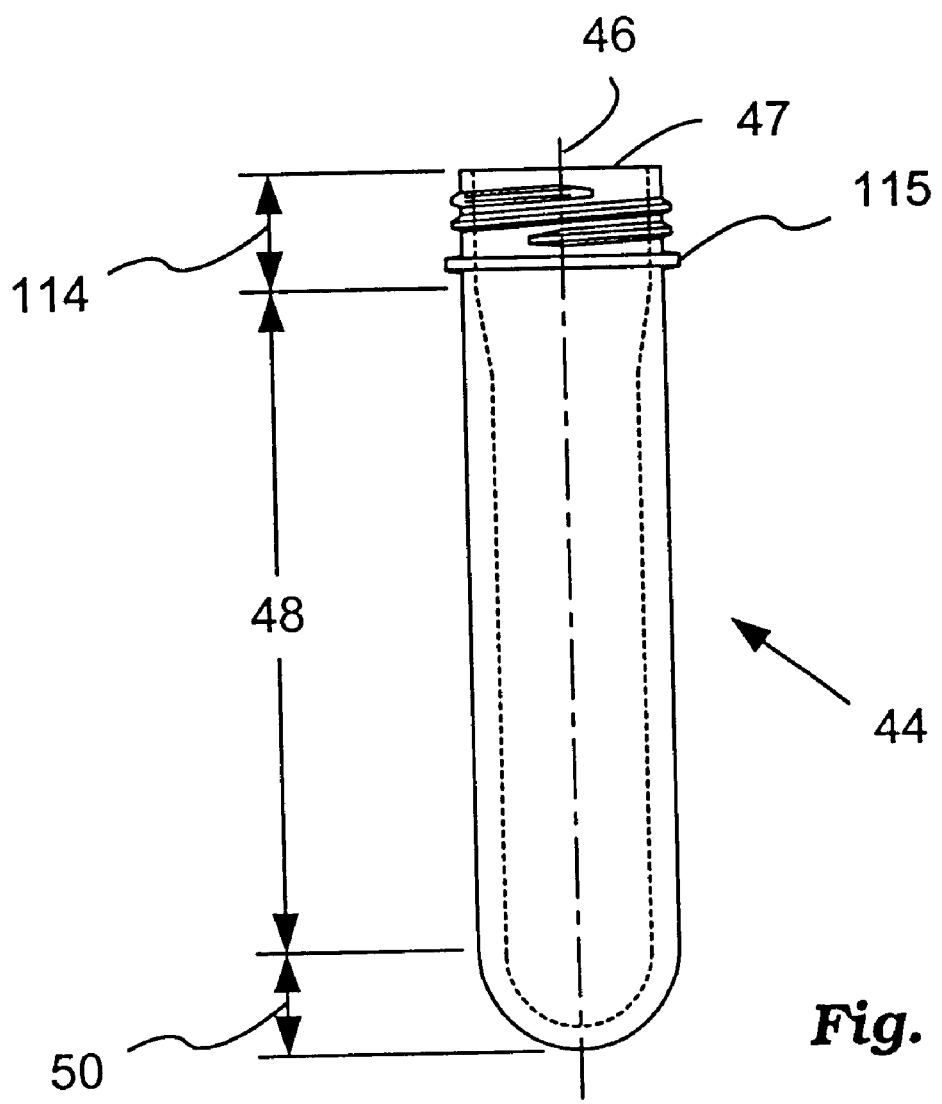
FIG. 10 is a side view of a preform.
Figure 11:
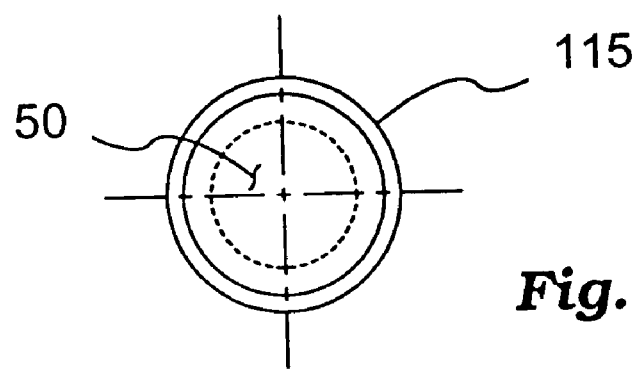
FIG. 11 is a bottom view of the preform shown in FIG. 10.

Bottle 10 is blow molded from an injection-molded preform 44, FIG. 10 and FIG. 11. Preform 44 is typical of those molding technicians use and features a preform longitudinal axis 46, open-end 47, preform neck finish 114, preform flange 115, preform body 48, and preform base 50. Molding technicians also refer to base 50 as a closed-end. Preform 44, as seen in FIG. 11, reveals its circular nature.

Those skilled in the art will realize that preform 44 size as illustrated in FIG. 10 and FIG. 11 is one of many alternatives possible. Relative to bottle overall longitudinal length, preform overall longitudinal length, for example, can differ significantly and will depend on the specifics of the particular process technology the molding technician uses.

A process approach molding technicians often refer to as "injection blow molding" uses a relatively hot pliable preform 44 placed in the blow-molding tool cavity and has an overall longitudinal length slightly less than bottle 10 overall longitudinal length. In other words, before preform 44 expands with air pressure, the closed-end 50 is in close proximity to the mold-cavity surface corresponding to push-up 24.

Another process approach that molding technicians often refer to as "stretch blow molding" or "biaxial molecular orientation blow molding" uses a relatively hot pliable preform 44 placed in the blow-molding tool cavity having an overall longitudinal length substantially less than bottle 10 longitudinal length. In stretch blow molding a stretch-rod entering through open-end 47 stretches preform 44 in a direction corresponding to the longitudinal axis 46 of preform 44 to place closed-end 50 in close proximity to the mold-cavity surface corresponding to push-up 24 before air pressure completely expands preform 44.

Although not an absolute requirement, but typical of many manufacturing applications that use the injection molded preform or its equivalent, preform neck finish 114 and preform flange 115 of preform 44 are generally identical to respective neck finish 14 and flange 15 of the bottle 10.

Figure 7:
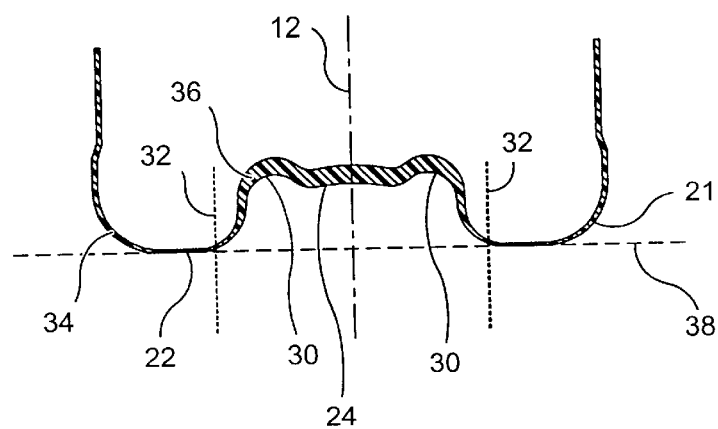
FIG. 7 is an enlarged partial cross-sectional view along line 7—7 of the bottom shown in FIG. 3.

Bottom 20 has a maximum wall section thickness and a minimum wall section thickness. In FIG. 7, boundary 32 separates a push-up wall region 36 from a contact wall region 34. The maximum wall section thickness is in a position somewhere within push-up wall region 36 surrounding longitudinal axis 12. The minimum wall section thickness is in a position somewhere within contact wall region 34 outside of push-up wall region 36. In other words, the push-up wall region 36 includes all areas of base 20 that are inside boundary 32. While push-up wall region 36 includes parts of push-up 24, push-up wall region 36 may not necessarily include all of push-up 24. Wall section thickness within bottom 20 continuously changes between the position of maximum wall section thickness and the minimum wall section thickness.

Typically, the thinnest wall section of bottom 20 is about 5 to 20 percent of the thickest wall section of bottom 20. A specific relationship of relative wall section thickness, for any given application, will depend on many general manufacturing process control settings (such as, mold and preform temperature, preform inflation pressure, process speed, and other control settings) and bottle and preform weight and dimensional details.

Boundary 32 is often an imaginary line and is, for typical applications, at a location where the thickness of the bottom wall section is about 25 to 40 percent of the thickest wall section. The location of boundary 32 is also where unwanted bottle 10 and base 20 distortions are not readily apparent.

Molding technicians can shift boundary 32 slightly for a given bottle and preform combination depending on specific process-control settings selected. A slower manufacturing rate and a higher preform inflation pressure, for example, will reduce distortion by providing better cooling of the relatively thick areas. Unfortunately, this approach reduces productivity and increases manufacturing cost.

While push-up wall region 36 can extend in a direction generally parallel to minor axis 28 to include a small portion of contact surface 22, it is desirable for push-up wall region 36 to be entirely within push-up 24. In other words, the contact wall region 34 generally should include part of push-up 24.

FIG. 4 illustrates a bottom view of bottle 10 similar to FIG. 3 showing a prior art bottom 120 with a chime 121 generally equivalent to chime 21, a push-up 124 generally equivalent to push-up 24 except rib-like grooves 30 (FIG. 3) are not present, and a contact surface 122 generally equivalent to contact surface 22. Longitudinal axis 112 (FIG. 5) is generally equivalent to longitudinal axis 12. Major or primary axis 126 is generally equivalent to major axis 26 and minor or secondary axis 128 is generally equivalent to minor axis 28. Major axis 126 and minor axis 128 intersect at point 112' corresponding to a point along longitudinal axis 112.

Boundary 132 is an imaginary line between a generally thicker push-up wall region 136 and a generally thinner contact wall region 134 (FIG. 5). Thickness relationship of push-up wall region 136 to contact wall region 134 respectively parallels those of push-up wall region 36 to contact wall region 34. In a direction substantially corresponding with minor axis 128, boundary 132 penetrates contact surface 122. Because the wall thickness of the push-up wall region 136 is significantly thicker than the wall thickness of the contact wall region 134, stresses are present that cause a distortion 40 creating a gap 42 between bottle 120 and resting surface 38 (see FIG. 5 and FIG. 6).

Preform 44 is heated to a sufficient temperature to become pliable and then expanded with air pressure against the mold-cavity surface generally corresponding to the outer surface of bottle 10 with base 20 or base 120. Regions of the preform that expand a greater distance tend to thin more than regions that expand a lesser distance. In the molding process, the closed-end 50 of preform 44 is in close proximity to the cavity surface that forms push-up 24 or push-up 124.

In the case of base 120, the closed-end 50 of preform 44 does not thin enough to prevent formation of thicken material in the contact surface 122 in the direction corresponding to minor axis 128.

In the case of base 20, the closed-end 50 of preform 44 must traverse standing rib-like projections in the mold-cavity that correspond to the rib-like grooves 30. The mold-cavity surface distance in the direction substantially parallel to the minor axis 28 and substantially perpendicular to the standing rib-like projections corresponding to the rib-like grooves 30 is longer allowing the closed-end 50 to thin more in the direction generally corresponding to minor axis 28 thus causing the generally thicker push-up wall region 36 to remain within push-up 24.

The inventors believe the standing rib-like projections of the mold-cavity of bottle 10 that correspond to the rib-like grooves 30 slightly alter preform 44 inflation dynamics. Because the preform 44 tends to expand from air pressure first in a direction of least resistance, the mold-cavity rib-like projections corresponding to the rib-like grooves 30 tend to initially channel movement of the expanding parison 44 adjacent to mold-cavity surfaces corresponding to base 20 in the direction generally parallel to major axis 26 thus encouraging additional material to flow in that direction before flow occurs over the rib-like projections corresponding to the rib-like grooves 30 in the direction generally parallel to minor axis 28. In other words, the rib-like projections corresponding to the rib-like grooves 30 briefly block or resist material flow from the expanding preform 44. The standing rib-like projections corresponding to the rib-like grooves 30 cause the preform 44 and the closed-end 50 of the preform 44 to stretch differently in the direction parallel to the major axis 26 thus favorably altering material thickness distribution within the base 20 of bottle 10.

The intent of the process invention is to position adequately shaped standing rib-like projections corresponding to the rib-like grooves 30 in the mold-base region forming push-up 24 of the mold-cavity forming bottle 10 that changes how pliable material within heated preform 44 and closed-end 50 flows from air pressure inflating preform 44 in such away that apparent distortions are prevented from occurring within contact surface 22.

Figure 8:
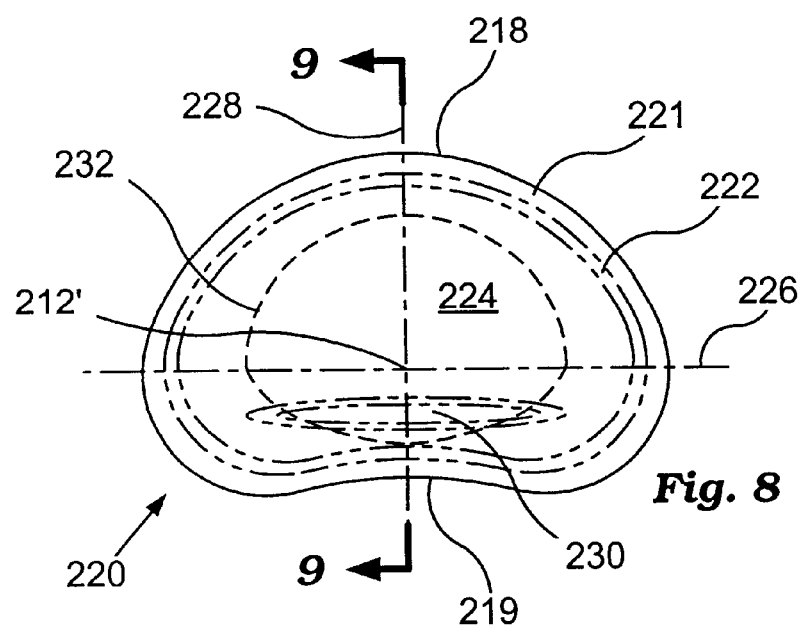
FIG. 8 is a bottom view of an alternative embodiment of the invention.
Figure 9:
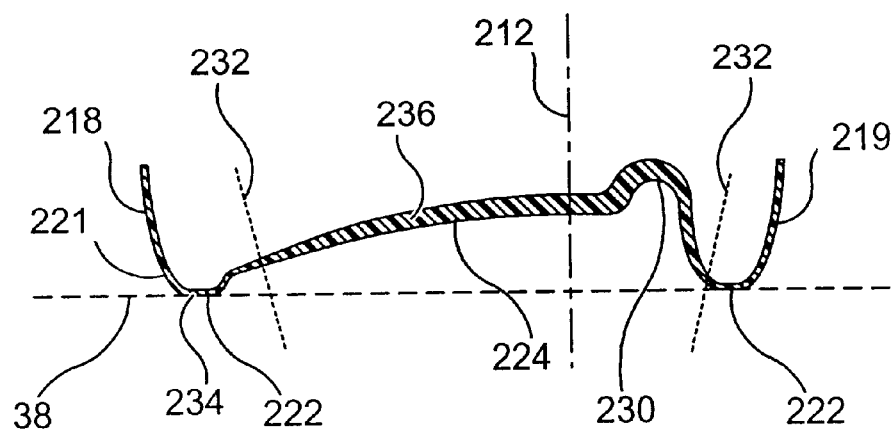
FIG. 9 is an enlarged partial cross-sectional view along line 9—9 of the bottom shown in FIG. 8.

FIG. 8 and FIG. 9 illustrate a bottom 220 having a substantially "kidney bean" configuration, that is, a non-symmetrical shape with a convex side 218 and a concave side 219 and a primary axis or major axis 226 and a secondary axis or minor axis 228. In this variation, the mold-base region of the mold-cavity has one standing rib-like projection corresponding to a rib-like groove 230 of base or bottom 220. The single rib-like groove 230 is generally parallel to the primary axis 226 and between primary axis 226 and concave side 219 and is generally appropriate for situations where the bottom material thickness distribution would otherwise favor the concave side 219 over the convex side 218.

Although somewhat off-center, longitudinal axis 212 corresponds with longitudinal axis of bottle and the corresponding mold-cavity used to manufacture the bottle. Furthermore, the preform 44 longitudinal axis 46, after inflation of preform 44 against mold-cavity, generally corresponds with longitudinal axis 212. Primary axis 226 intersects secondary axis 228 at point 212' and corresponds to a point along longitudinal axis 212.

Chime 221 generally corresponds with chime 21. Except for the non-symmetrical shape, contact surface 222 generally corresponds with contact surface 22 and push-up 224 generally corresponds with push-up 24. Boundary 232 generally corresponds to boundary 32 and is between a generally thicker push-up wall region 236 and a generally thinner contact surface 222.

Figure 6:
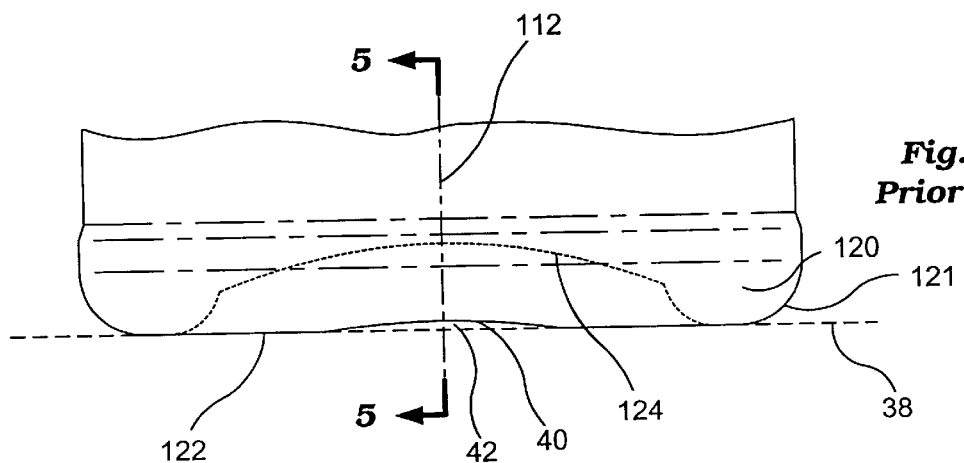
FIG. 6 is an enlarged partial front elevational view of the bottom shown in FIG. 4.

Without the standing rib-like projection corresponding with rib-like groove 230 in the mold-cavity of bottom 220, boundary 232 would significantly extend over contact surface 222 along concave side 219 likely resulting in a distortion similar to the distortion 40 and a gap similar to the gap 42 both as shown in FIG. 5 and FIG. 6. The standing rib-like projection corresponding with rib-like groove 230 provides a longer surface distance in a direction substantially parallel to secondary axis 228 and between longitudinal axis 212 and concave side 219. Expanding preform 44 and closed-end 50 must traverse this longer surface distance causing the material to thin thus shifting boundary 232 adjacent to concave side 219 to be within push-up 224 and inside of contact surface 222. Thickness relationship of push-up wall region 236 to contact wall region 234 respectively parallels those of push-up wall region 36 to contact wall region 34.

We claim:

1. A base portion of a blow-molded polyester bottle, said base portion merging with a bottle sidewall and said bottle sidewall merging with an open end, said base portion comprising:

a chime;

a noncircular cross-sectional shape defined through said chime and defining a major axis and a minor axis, said noncircular cross-sectional shape including a convex front portion and a concave back portion connected by curved end portions, said front portion and said back portion are oriented generally in the direction of said major axis and transverse to said minor axis;

a contact surface merging with said chime;

a push-up region merging with said contact surface and located radially inward therefrom; and at least one upstanding rib located within said push-up region and oriented substantially parallel to said major axis.

2. A base portion of a blow-molded polyester bottle, said base portion merging with a bottle sidewall and said bottle sidewall merging with an open end, said base portion comprising:

a chime;

a noncircular cross-sectional shape defined through said chime and defining a major axis and a minor axis;

a contact surface merging with said chime;

a push-up region merging with said contact surface and located radially inward therefrom; and at least one generally straight upstanding rib within said push-up region and oriented in a direction generally parallel to and offset from said major axis, wherein said base portion has its thickest portion located within said push-up and wherein said contact surface along said minor axis has a maximum thickness which is less than about 25 percent of said thickest portion.

3. A base portion of a blow-molded polyester bottle according to claim 2 wherein said base portion includes two ribs.

4. A base portion of a blow-molded polyester bottle according to claim 3 wherein said two ribs are generally parallel to one another and separated by said major axis.

5. A base portion of a blow-molded polyester bottle according to claim 2 wherein said rib begins on one half of said base portion and terminates on an opposing half of said base portion.

6. A base portion of a blow-molded polyester bottle according to claim 5 wherein said rib is uninterrupted.

7. A base portion of a blow-molded polyester bottle according to claim 2 wherein said rib extends across said minor axis.

8. A base portion of a blow-molded polyester bottle according to claim 2 wherein said cross-sectional shape is one of a generally rectangular or generally oval cross-sectional shape.

9. A base portion of a blow-molded polyester bottle, said base portion merging with a bottle sidewall and said bottle sidewall merging with an open end, said base portion comprising:

a chime;

a noncircular cross-sectional shape defined through said chime and defining a major axis and a minor axis;

a contact surface merging with said chime;

a push-up region merging with said contact surface and located radially inward therefrom; and at least one generally straight upstanding rib within said push-up region and oriented in a direction generally parallel to and offset from said major axis, wherein said base portion has its thickest portion located within said push-up and wherein said contact surface along said minor axis has a maximum thickness which is less than about 40 percent of said thickest portion.

10. A base portion of a blow-molded polyester bottle according to claim 9 wherein said base portion includes two upstanding ribs located generally parallel to one another and separated by said major axis.

11. A base portion of a blow-molded polyester bottle according to claim 9 wherein said cross-sectional shape is one of a generally rectangular or generally oval cross-sectional shape.

12. A base portion of a blow-molded polyester bottle, said base portion merging with a bottle sidewall and said bottle sidewall merging with an open end, said base portion comprising:
- a chime;
- a noncircular cross-sectional shape defined through said chime and defining a major axis and a minor axis;
- a contact surface merging with said chime;
- a push-up region merging with said contact surface and located radially inward therefrom; and
- at least one generally straight upstanding rib within said push-up region and oriented in a direction generally parallel to and offset from said major axis, wherein said base portion includes a boundary located within said push-up, said boundary defined by a wall thickness being no more than about 40 percent of the thickness of a thickest portion of said base portion.

13. A base portion of a blow-molded polyester bottle according to claim 12 wherein said boundary is defined by a wall thickness being between about 25 and 40 percent of the thickness of said thickest portion.

14. A base portion of a blow-molded polyester bottle according to claim 12 wherein said boundary is defined by a wall thickness being no less than about 25 percent of the thickness of said thickest portion.

15. A base portion of a blow-molded polyester bottle, said base portion merging with a bottle sidewall and said bottle sidewall merging with an open end, said base portion comprising:
- a chime;
- a noncircular cross-sectional shape defined through said chime and defining a major axis and a minor axis;
- a contact surface merging with said chime;
- a push-up region merging with said contact surface and located radially inward therefrom; and
- at least one generally straight upstanding rib within said push-up region and oriented in a direction generally parallel to and offset from said major axis, wherein said cross-sectional shape includes a convex front portion and a concave back portion connected by curved end portions.

16. A base portion of a blow-molded polyester bottle according to claim 15 wherein said front portion and said back portion are oriented generally in the direction of said major axis and transverse to said minor axis.

17. A base portion of a blow-molded polyester bottle according to claim 15 wherein said rib extends across said minor axis, a first end beginning on one half of said base portion and a second end terminating on an opposing half of said base portion.

* * * * *